No. 789,614. PATENTED MAY 9, 1905.
J. KOELNER.
APPARATUS FOR MIXING AND KNEADING DOUGH.
APPLICATION FILED JUNE 11, 1904.
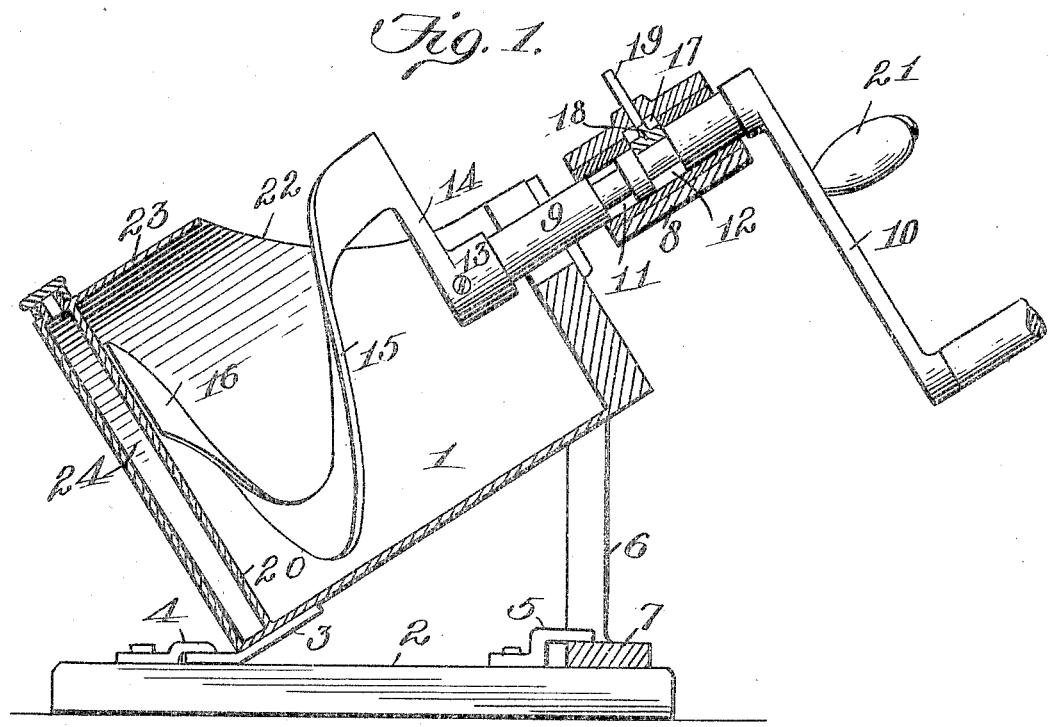
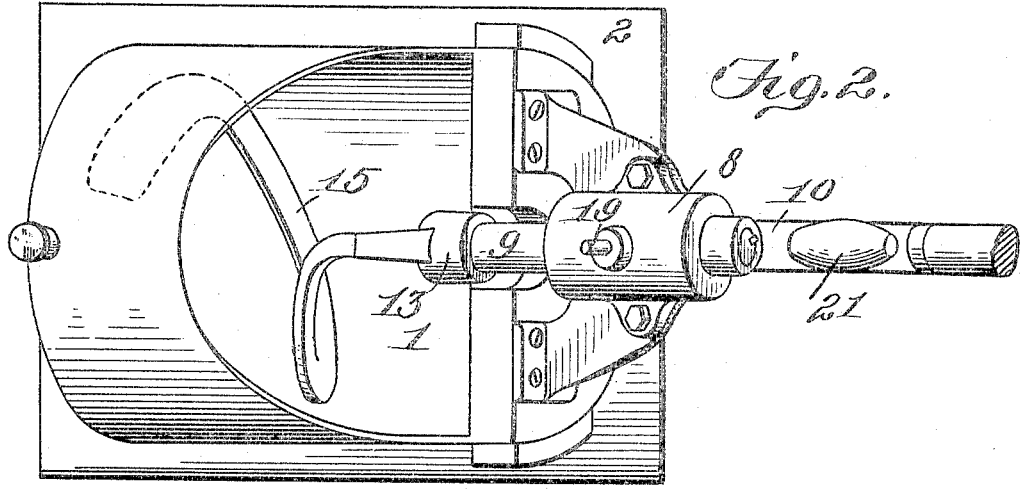
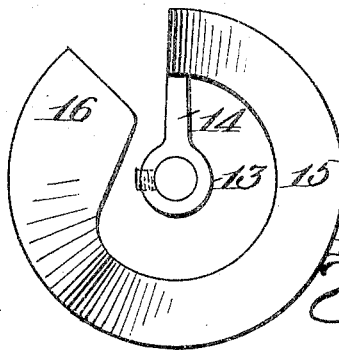
Witnesses:
C. D. Kesler.
Dennis Sumby
Inventor
John Koelner
By James L. Norris
Atty No. 789,614. Patented May 9, 1905.

UNITED STATES PATENT OFFICE.

JOHN KOELNER, OF MILWAUKEE, WISCONSIN.

APPARATUS FOR MIXING AND KNEADING DOUGH.

SPECIFICATION forming part of Letters Patent No. 789,614, dated May 9, 1905.

Application filed June 11, 1904. Serial No. 212,140.

*To all whom it may concern:*

Be it known that I, JOHN KOELNER, a citizen of the United States, residing at Milwaukee, in the county of Milwaukee and State of Wisconsin, have invented new and useful Improvements in Apparatus for Mixing and Kneading Dough, of which the following is a specification.

This invention relates to certain new and useful improvements in apparatus for mixing and kneading dough, and aims to improve in certain particulars the apparatus forming the subject-matter of Letters Patent No. 743,090 granted to me November 3, 1903. The machine forming the subject-matter of said patent was designed for use in mills for testing the flour, whereas the present machine is designed more especially for household use. In the said patented machine the trough or receptacle for the dough is disposed horizontally, and the mixing and kneading blade is adjustably secured upon the driving-shaft and has a uniform width throughout.

The present invention relates to a machine which is normally inclined to the horizontal and has at its lower end or bottom a water jacket or compartment, and the spiral blade mounted within the dough-receptacle has a widened terminal edge portion working in close proximity to the wall of said water-compartment.

In order that the invention may be clearly understood, I have illustrated the same in the accompanying drawings, in which—

Figure 1 is a vertical sectional view. Fig. 2 is a top plan view, and Fig. 3 is a detail view of the blade.

Referring to the drawings, 1 indicates the dough-receptacle, which is supported in an inclined position on a base 2. The receptacle 1 is provided at its lower end or bottom with a projecting tongue 3, which is designed to be received under a keeper 4, provided on the base 2 near one end thereof. At the opposite end of the base two similar keepers 5 are provided. Secured to the upper end of the receptacle 1 is a support for the receptacle comprising uprights 6, connected by a flat cross-bar 7 at their lower ends, which is designed to be received beneath the two keepers 5, referred to. By this means the apparatus as a whole may bere movably secured in an inclined position on the support 2 by simply passing the tongue 3 and the cross-bar 7 beneath the respective keepers 4 and 5.

8 indicates a bearing secured on the upper end of the receptacle 1 and in which is adjustably mounted a shaft 9, having secured on its upper end a crank-handle 10. Said shaft is provided intermediate its ends with two separated grooves 11 12. On the opposite ends of the shaft is suitably secured the mixing and kneading blade consisting of a hub 13, an arm 14, projecting at right angles to said hub, and a spiral blade 15, extending from the arm 14, said hub, arm, and blade being formed as an integral structure. The terminal portion or free end of said spiral blade is widened approximately to about twice the width of the remaining portion of the blade, as indicated at 16. The upper half of the bearing 8 is provided on its under side with a recess 17, which is designed to receive a curved block or chuck 18, having a pin 19, extending upward through an aperture in the bearing. The chuck 18 is designed to fit into the one or the other of the grooves 11 12 of the shaft 9. For example, suppose the shaft 9 to be in its extreme inward adjusted position. The chuck 18 will then be in the groove 12. If it be desired to adjust the spiral blade so that the terminal portion 16 shall be at a greater distance from the bottom 20 of the receptacle, the operator grasps the pin 19 and raises the chuck 18 out of the groove 12. The handle 10 is then grasped and an outward pull applied thereto which will draw the shaft 9 outward until the groove 11 comes beneath the chuck 18, when the operator then presses the pin 19 inward, so that said chuck will engage in said groove 11. The shaft will thus be held in this adjusted position and may be freely rotated, the chuck working smoothly in either of said grooves.

It will be seen that the construction described provides a much simpler means of adjusting the spiral blade than that shown in my patent referred to, the adjusting mechanism being on the outside of the apparatus and within easy reach. To facilitate the adjustment of the shaft, I provide on the crank-handle an auxiliary handle 21 intermediate the ends of the crank portion.

In the construction shown in the patent above noted, as well as in other prior patents granted to me, the dough receptacle or trough is open throughout its entire length on its upper side. In the present construction I cut away a portion only of the cylinder forming the receptacle 1 to provide an opening 22, leaving a covered portion 23, which is necessary, owing to the inclined position of the receptacle. In addition I provide a water-compartment 24 adjacent to the end 20, which may be supplied with water at a given temperature in order to maintain the dough at a uniform temperature during the mixing and kneading. The widened end portion 16 of the blade assures the maximum kneading effect, in that a larger quantity of the dough will be pressed against the bottom 20 of the receptacle than would be the case were the blade of a uniform width throughout, as in my previous constructions.

The inclined position of the receptacle will cause the liquid constituents of the dough in the initial mixing to flow to the bottom of the receptacle, where they may be more rapidly mixed or combined with the flour. At the same time that the inclined position possesses this advantage over the horizontal position it also possesses the advantage over a vertically-disposed receptacle in that it will not prevent to such a great extent the retrogressive movement of the dough in the kneading operation.

The ingredients of the dough when first placed in the receptacle are in a liquid or watery condition, so that when the spiral blade is turned all of the constituents of the dough will be thoroughly mixed. Flour is of course added from time to time and the dough is finally obtained in a thick plastic condition. The spiral blade is then adjusted inwardly to move the shaft 9, as previously described, so as to bring the broadened terminal portion 16 into substantially close relation to the bottom 20 of the receptacle. The rotation of the blade is then continued through the medium of the crank-handle 10 and the operation of mixing and kneading progresses under the action of the spiral blade in a manner well known to those skilled in the art.

Having thus fully described the invention, what I claim as new, and desire to secure by Letters Patent, is—

1. Apparatus for mixing and kneading dough, comprising an inclined cylindrical receptacle having an opening 22 formed in its upper side at its upper end, and a covered portion 23 provided at its lower end, a water jacket or compartment also provided at said lower end, a spiral blade mounted in said receptacle and concentric to the axis thereof, and having a widened terminal edge portion working in proximity to the wall of said compartment, and means for turning said blade.

2. Apparatus for mixing and kneading dough, comprising a receptacle, a bearing mounted on said receptacle, a shaft mounted in said bearing and extending into said receptacle and capable of longitudinal movement in said bearing and said receptacle and provided with a number of grooves, a blade mounted on said shaft and located within said receptacle, a movable chuck mounted in said bearing and adapted to engage in one or the other of said grooves, and means for turning said shaft.

3. Apparatus for mixing and kneading dough, comprising a receptacle, a bearing mounted thereon, and provided with an interior recess, a shaft mounted in said bearing and extending into said receptacle and capable of longitudinal movement in said bearing and said receptacle, and provided with a number of grooves, a chuck adapted to seat in said recess and to be moved into engagement with one or the other of said grooves, a pin secured in said chuck and projecting outward through the bearing, and a handle for turning said shaft.

In testimony whereof I have hereunto set my hand in presence of two subscribing witnesses.

JOHN KOELNER.

Witnesses:
   FRED. G. DORNER,
   E. G. RAHR.